(12) United States Patent
Archambault et al.

(10) Patent No.: US 8,191,056 B2
(45) Date of Patent: May 29, 2012

(54) SPARSE VECTORIZATION WITHOUT HARDWARE GATHER/SCATTER

(75) Inventors: Roch Georges Archambault, North York (CA); George Chochia, Poughkeepsie, NY (US); Peng Zhao, North York (CA)

(73) Assignee: International Business Machines Corporation, Armonk, NY (US)

( * ) Notice: Subject to any disclaimer, the term of this patent is extended or adjusted under 35 U.S.C. 154(b) by 1627 days.

(21) Appl. No.: 11/549,172

(22) Filed: Oct. 13, 2006

(65) Prior Publication Data

US 2008/0092125 A1    Apr. 17, 2008

(51) Int. Cl.
*G06F 9/45* (2006.01)
(52) U.S. Cl. ..................................................... 717/161
(58) Field of Classification Search .................. 717/161
See application file for complete search history.

(56) References Cited

U.S. PATENT DOCUMENTS 7,676,647 B2 * 3/2010 Codrescu et al. ................. 712/2
7,962,906 B2 * 6/2011 O'Brien et al. ............... 717/160
2006/0020595 A1 1/2006 Norton et al.
2006/0029279 A1 2/2006 Donoho
2009/0013301 A1 * 1/2009 Ogilvie et al. .................. 716/18

OTHER PUBLICATIONS

Optimizing Sparse Matrix-Vector Product Computations Using Unroll and Jam; Mellor-Crummey, J. (Dept. of Comput. Sci., Rice Univ., Houston, TX, USA); Garvin, J. Source: International Journal of High Performance Computing Applications, v 18,n 2, Summer 2004, p. 225-38, Sage Science Press, USA.

* cited by examiner

*Primary Examiner* — John Chavis
(74) *Attorney, Agent, or Firm* — Yee & Associates, P.C.

(57) ABSTRACT

A target operation in a normalized target loop, susceptible of vectorization and which may, after compilation into a vectorized form, seek to operate on data in nonconsecutive physical memory, is identified in source code. Hardware instructions are inserted into executable code generated from the source code, directing a system that will run the executable code to create a representation of the data in consecutive physical memory. A vector loop containing the target operation is replaced, in the executable code, with a function call to a vector library to call a vector function that will operate on the representation to generate a result identical to output expected from executing the vector loop containing the target operation. On execution, a representation of data residing in nonconsecutive physical memory is created in consecutive physical memory, and the vectorized target operation is applied to the representation to process the data.

30 Claims, 4 Drawing Sheets

SPARSE VECTORIZATION WITHOUT HARDWARE GATHER/SCATTER

FIELD OF THE INVENTION

The present invention relates to compilation of computer programs, and more particularly to vectorization of portions of computer programs.

BACKGROUND OF THE INVENTION

Computer software comprises a set of instructions to be executed by a data processing system. Generally, it is the computer software which makes a data processing system useful, by providing the instructions for the data processing system to carry out productive tasks. Computer software provides instructions that enable a data processing system to function as, for example, a word processing device, spreadsheet device, or an Internet browsing device.

There are a wide variety of different data processing systems capable of using computer software. Accordingly, as used herein, the term "data processing system" is intended to have a broad meaning, and may include personal computers, laptop computers, palmtop computers, handheld computers, network computers, servers, mainframes, workstations, cellular telephones and similar wireless devices, personal digital assistants and other electronic devices on which computer software may be installed. The terms "computer", "computer software", "computer program", "computer programming", "software", "software program" and related terms are intended to have a similarly broad meaning.

Generally, modern computer software is originally written in a "high level" computer programming language using syntactic constructs that are comprehensible by a programmer to represent the instructions embodied in the software. For example, in the "C" programming language, the syntactic term "printf" is used to represent an instruction to the data processing system to print the contents of a particular data field. High level computer programming languages are useful because their syntactic constructs make it easier for programmers to create computer software, since they do not need to compose instructions in a language that would be directly understood by the data processing system. Writing instructions in such a language would be far more difficult because such languages bear little or no resemblance to any human language.

Instructions written in a high level computer programming language, however, generally cannot be directly understood and implemented by a data processing system. Therefore, before a computer program written in a high level computer programming language may be used by a data processing system, it must first be "compiled" into language that will be understood by the target data processing system. Compiling is a process, usually carried out by a computer program called a "compiler", in which the syntactic constructs of the high level computer programming language are in essence translated into instructions in a language that will be understood by the target data processing system (possibly through an intermediate software layer). The result of the "compiling" or "compilation" process is known as "executable code", meaning computer program code that can be executed by the data processing system either directly or by an intermediate software layer.

Usually, a direct translation of a computer program written in a high level computer programming language into executable code will not result in particularly efficient executable code. There may be, for example, redundant operations, inefficient allocations of memory within the data processing system, and other circumstances which would impair the efficiency of the executable code. In addition, the order of instructions specified by the human programmer may not be the most efficient, or even nearly the most efficient, way to carry out the instructions on the data processing system. To obviate these difficulties, various performance improvement algorithms are applied when compiling computer programs written in a high level computer programming language.

One example of such a performance improvement algorithm is vectorization. The term "vectorization" refers to a process in which operations that would have been performed iteratively on one target data element at a time (referred to as "scalar processing") are instead performed on a vector made up of a set of target data elements, thereby enabling the data elements to be operated on at rates exceeding the result rates of simple scalar processing. Thus, one type of performance improvement algorithm that can be applied by a compiler is to transform scalar operations into vector operations.

SUMMARY OF THE INVENTION

In one aspect, the present invention is directed to a method for compiling source code into executable code. A target operation contained within a normalized target loop in the source code is identified, which target operation is susceptible of vectorization and may, after compilation into a vectorized form, seek to operate on data contained in nonconsecutive physical memory. Hardware instructions are inserted into the executable code, which direct a computer platform on which the executable code will run to create a representation of the data in consecutive physical memory. Within the executable code, a vector loop containing the target operation is replaced with a function call to a vector library. The function call will call a vector function that will operate on the representation to generate a result identical to output expected from execution of the vector loop containing the target operation.

In one embodiment, the representation comprises a copy of each element of the data. In another embodiment, the representation comprises an index array in which each element of the index array points to an element of the data. In a particular exemplary embodiment in which the representation comprises an index array, the step of replacing the vector loop containing the target operation with a function call to a vector library is preceded by a step of splitting a statement in the target loop containing the target operation and distributing the target loop into one or more non-vector loops containing at least one non-vector statement and the vector loop containing the target operation. In another exemplary embodiment, the vector loop that is replaced is the target loop.

In another aspect, the present invention is directed to a method of applying a vectorized target operation to data residing in nonconsecutive physical memory. A representation of the data is created in consecutive physical memory, and the vectorized target operation is applied to the representation.

In one embodiment, creating the representation comprises copying the data into a single consecutive memory area to create contiguous duplicate data, and applying the vectorized target operation comprises carrying out the vectorized target operation on the contiguous duplicate data. In another embodiment, creating the representation comprises creating an index array in which each element of the index array points to an element of the data, and applying the vectorized target operation comprises passing the index array to a vector library function and carrying out the vector library function.

In other aspects, the present invention is directed to computer program products and data processing systems for implementing the above-described methods.

BRIEF DESCRIPTION OF THE DRAWINGS

The novel features believed characteristic of the invention are set forth in the appended claims. The invention itself, however, as well as a preferred mode of use, and further objectives and advantages thereof, will best be understood by reference to the following detailed description of certain illustrative embodiments when read in conjunction with the accompanying drawings, wherein:

DETAILED DESCRIPTION OF PREFERRED EMBODIMENTS

Figure 1:
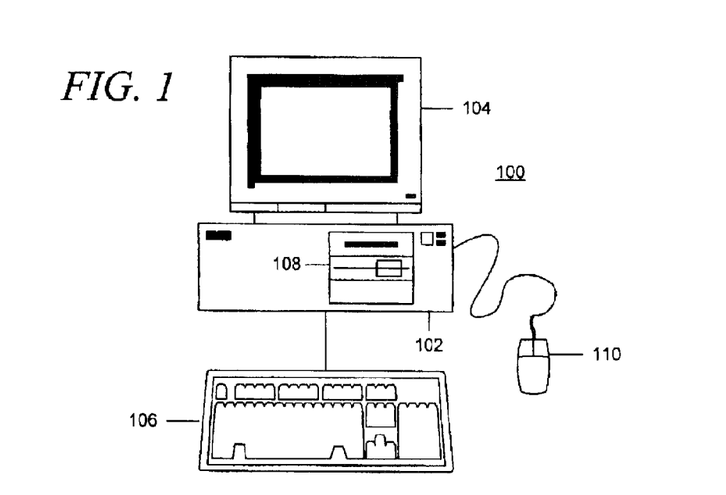
FIG. 1 is a pictorial representation of a data processing system in which aspects of the present invention may be implemented.

FIG. 1 is a pictorial representation of a data processing system in which aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 may be implemented using any suitable computer, such as an IBM® eServer™ computer or IntelliStation® computer, which are products of International Business Machines Corporation, located in Armonk, N.Y. Although the depicted representation shows a personal computer, exemplary aspects of the present invention may be implemented in other types of data processing systems, such as laptop computers, palmtop computers, handheld computers, network computers, servers, workstations, cellular telephones and similar wireless devices, personal digital assistants and other electronic devices on which software programs may be installed. Computer 100 also preferably includes a graphical user interface (GUI) that may be implemented by means of systems software residing in computer readable media in operation within computer 100.

Figure 2:
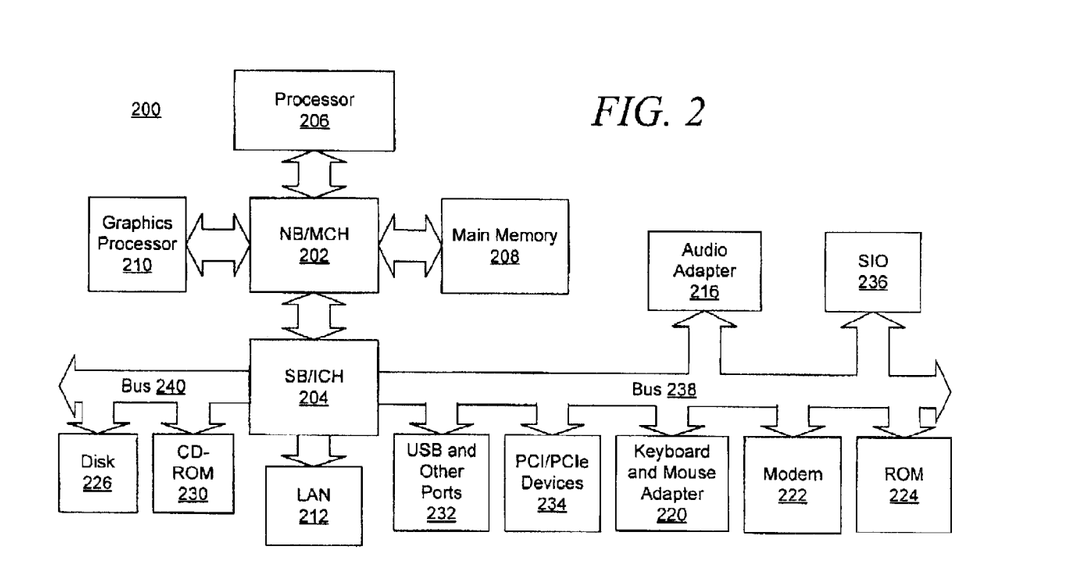
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as personal computer 100 in FIG. 1, in which code or instructions implementing the processes of the exemplary aspects may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH 202 through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 424, universal serial bus (USB) ports and other communications ports 232, and PCI/PCIe devices 234 connect to south bridge and I/O controller hub 204 through bus 238. Hard disk drive (HDD) 226 and CD-ROM drive 230 connect to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. (Java and all Java-related trademarks are trademarks of Sun Microsystems, Inc. in the United States, other countries, or both.)

Instructions for the operating system, the object-oriented programming system, and applications or programs are located on storage devices, such as hard disk drive 226, and may be loaded into main memory 208 for execution by processor 206. Aspects of the present invention may be performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which may be configured with flash memory to provide non-volatile memory for storing operating system files and/or user-generated data. A memory may be, for example, main memory 208 or a cache such as found in north bridge and memory controller hub 202. A processing unit may include one or more processors. The depicted examples in FIGS. 1-2 and above-described examples are not meant to imply architectural limitations. For example, data processing system 200 also may be a tablet computer, laptop computer, or telephone device in addition to taking the form of a PDA.

Certain types of computer, such as (for example) Cray-1 and its descendents, are designed and constructed to facilitate the use of vector operations. Accordingly, such computers can be instructed to carry out a vector operation on a set of data through the use of (relatively) simple hardware instructions. However, for general purpose computers, such as (for example) POWER4™ and POWER5™ computers offered by International Business Machines Corporation, which do not have vector function units as built-in hardware components, vector operations are carried out through the use of highly tuned library functions. These library functions can vectorize loops with dense vectors (a "dense vector" is one in which the data elements being operated on reside consecutively in the computer's memory) as shown in example (a) below. Example (a) is a code segment written in the C programming language:

```
for (i=0; i<N; ++i) {
    a[i] = sqrt (b[i]);
}
```

In the examples used herein, the notation "[i]" refers to the $i^{th}$ element of each vector, and "sqrt" represents the operation of taking the square root of the target data element. Accordingly, in example (a) above, the first element of vector "a" will be set equal to (that is, replaced in memory by) the square root of the first element of vector "b", the second element of vector "a" will be set equal to the square root of the second element of vector "b", and so on until i reaches N. This is an example of an operation on a dense vector because every element of vector "b" will be operated on, and thus (where vector "b" resides in consecutive memory) every target data element (that is, every data element in vector "b") resides in consecutive memory. Accordingly, if vector "a" was originally {1, 2, 3, 4, 5, 6} and vector "b" was originally {4, 9, 16, 25, 36, 49}, vector "a" would be {2, 3, 4, 5, 6, 7} after the loop has finished iterating.

While the examples contained herein use the C programming language, it is to be understood that aspects of the present invention are applicable to other programming languages as well, including (but not limited to) C++ and Fortran. Accordingly, the use of the C programming language for illustration herein should not be construed as limiting the scope of the present invention to the C programming language.

The library functions provided for general purpose computers are unsuitable for operations on loops having sparse vectors. "Sparse vectors" are those where the target data elements being operated on form a subset of a dense vector and therefore do not reside in consecutive memory. Example (b) below is an example of a sparse vector operation, and, like example (a), is a code segment written in the C programming language:

```
for (i=0; i<N; ++i) {
    if (b[i] > 5)
        a[i] = sqrt (b[i]);
}
```

In example (b) above, the $i^{th}$ element of vector "a" will be set equal to the square root of the $i^{th}$ element of vector "b" only where the $i^{th}$ element of vector "b" is greater than 5; otherwise the $i^{th}$ element of vector "a" will be unchanged. Thus, if vector "a" were equal to {1, 2, 3, 4, 5, 6} and vector "b" were equal to {4, 9, 1, 16, 4, 25}, the result for vector "a", after the loop has finished iterating, will be {1, 3, 3, 4, 5, 5}. This is because the first, third and fifth data elements of vector "b" were not greater than 5, and thus only the second, fourth and sixth elements of vector "b" were operated on with the results used to replace the corresponding elements of "a". It will be observed that because only the second, fourth and sixth elements of vector "b" were operated on, where vector "b" occupies contiguous physical memory, the second, fourth and sixth elements of vector "b" will not occupy contiguous physical memory and example (b) will therefore be a sparse vector operation.

Example (c) below, like examples (a) and (b), is a code segment written in the C programming language:

```
for (i=0; i<N; ++i) {
    a[i] = sqrt(b[2*i]);
}
```

In this example, the value of each $i^{th}$ element of vector "a" will be set equal to (that is, replaced by) the square root of the $(2*i)^{th}$ element of vector "b". For example, if vector "a" were initially equal to {1, 2, 3, 4, 5} and vector "b" were equal to {4, 9, 16, 25, 36, 49, 64, 81, 100, 121}, then the resultant vector "a", after the above loop has finished iterating, will be {2, 4, 6, 8, 10}. Specifically, the first element (i.e. i=0) of vector "a" is replaced by the square root of the $(2*0)^{th}$ element (that is, the $1^{st}$ element) of vector "b", the second element of vector "a" (i=1) is replaced by the square root of the $(2*1)^{th}$ element (that is, the $3^{rd}$ element) of vector "b", the third element of vector "a" (i=2) will be replaced by the square root of the $(2*2)^{th}$ element (that is, the $5^{th}$ element) of vector "b", the fourth element of vector "a" (i=3) will be replaced by the square root of the $(2*3)^{th}$ element (that is, the $7^{th}$ element) of vector "b", and the fifth element of vector "a" (i=4) will be replaced by the square root of the $(2*4)^{th}$ element (that is, the $9^{th}$ element) of vector "b". Because every second data element of vector "b" is operated on, where vector "b" is stored in contiguous physical memory, the loop in example "c" will represent an operation on a sparse vector.

The square root operations in the above examples (a), (b) and (c) are very expensive in terms of machine cycles. Moreover, dense vectorization can only vectorize the loop in example (a) into "vsqrt(&a[0], &b[0], N)". While the sparse vector loops in examples (b) and (c) can be relatively easily vectorized on vector machines (that is, machines having specialized hardware to support vector instructions) through hardware gather/scatter instructions, such an approach is not available for general purpose computers, resulting in slower computational speed and other disadvantages.

Dense vectorization algorithms operate on the assumption that the data feeding the vector operations are consecutive in memory, thus, undesirable results occur when this is not the case (i.e. with sparse vectors).

According to an aspect of the present invention, much of the existing infrastructure of general purpose computers is enabled to handle sparse vectors through modification of the method of compilation of the source code.

Figure 3:
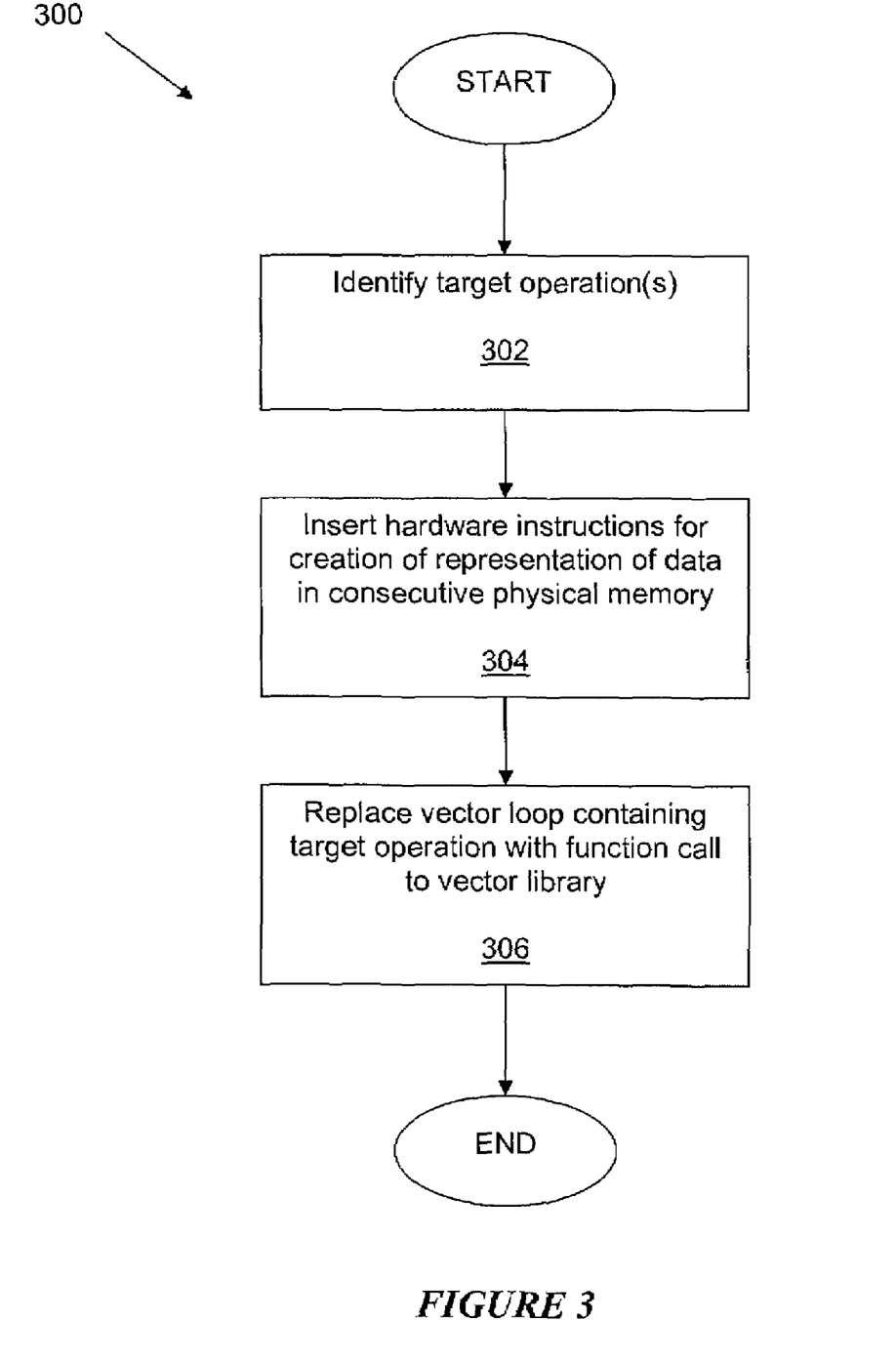
FIG. 3 is a flow chart showing a method for compiling source code into executable code according to an aspect of the present invention.

With reference now to FIG. 3, an exemplary method according to an aspect of the present invention is shown generally at 300, with respect to a compiler program implementing an aspect of the present invention.

A compiler program implementing an aspect of the present invention will, at step 302, identify one or more target operations in a target loop in the source code. These target operations are preferably expensive operations that present opportunities for performance improvement through vectorization but which may, after compilation to a vectorized form, seek to operate on data contained in nonconsecutive physical memory. Potential target operations include sqrt, div, exp, log, sin, cos and others. At step 302, the compiler program will parse each loop looking for candidate operations. For a target operation to be a valid candidate, the loop containing the target operation has to be normalized, (i.e. the loop iterates starting from 0, in the form of "do i=0, N, 1", where N can be any expression). In addition, depending on the computer system for which the source code is being compiled and the implementation of library vector functions for that computer system, operations on some data types cannot be vectorized.

Preferably, in order to be considered a valid candidate, the loop's trip count should be sufficiently high to offset the overhead of calling a library function. The exact threshold will depend on the implementation of vector functions for the type of computer system for which the source code is being compiled. In one embodiment, where the trip count is unknown, the loop can be versioned so that one copy of the loop is guaranteed to have a sufficient trip count.

During step 302, the compiler program will identify traditional dense vector operations, and will also identify target operations that may, after compilation to a vectorized form, seek to operate on data contained in nonconsecutive physical memory (i.e. sparse vector operations). Sparse vector operations will exist when a vector operation is executed conditionally (as shown in example (b) above), or when the data feeding the vector operation is not stored in consecutive physical memory (as shown in example (c) above). Thus, the "sqrt" in examples (b) and (c) above would be considered target operations.

Once the target operations have been identified, the compiler program will, at step 304, insert specific hardware instructions into the executable code (that is, the executable code resulting from compilation of the source code). The hardware instructions will direct the computer platform on which the executable code will run to create a representation of the data in consecutive physical memory.

For vector statements guarded by a condition, such as example (b) above, the compiler will insert instructions into the executable code that will direct the target computer platform to create a representation of the data in the form of an index array that contains the iteration numbers for which the vector operation will be executed.

For vector statements that are executed unconditionally, such as example (c) above, the compiler can choose either to insert a hardware instruction to create a representation of the data by copying the sparse vector into a dense temporary vector or to create a representation of the data in the form of an index array.

Thus, in one embodiment, the compiler inserts hardware instructions to cause the target computer system to copy the non-consecutive data into a dense temporary vector which can then be fed to vector operations. (If necessary, the data from the dense temporary vector can later be copied back into one or more sparse vectors.) In this embodiment, the representation in consecutive physical memory will comprise a copy of each element of the data.

In another embodiment, the compiler will insert hardware instructions to cause the target computer platform to create an index array, and pass that index array along with the sparse vector into a library function. In this embodiment, the representation of the data in consecutive physical memory will comprise an index array in which each element of the index array points to an element of the data. Using the index array approach can reduce the number of temporary vectors created and alleviate the need to execute vector copy operations; however, it requires creation of new vector functions to handle the index array and results in operations on a sparse vector that could reduce reuse opportunities. Accordingly, the algorithm by which the compiler selects either the temporary vector approach or the index array approach should be designed to take these factors into account to the extent practicable.

Once the compiler has inserted the necessary instructions for creation of a representation of the data in consecutive physical memory, the compiler will, at step 306, replace, within the executable code generated by the compiler from the source code, a vector loop containing the target operation with a function call to a vector library. The function call will call a vector function that will operate on the representation (created in response to the hardware instruction inserted at step 304) to generate a result identical to output expected from execution of the vector loop containing the target operation. Thus, replacing the vector loop containing the target operation with the function call will not affect the substantive output generated by the computer program in which the target operation was included.

Figure 4:
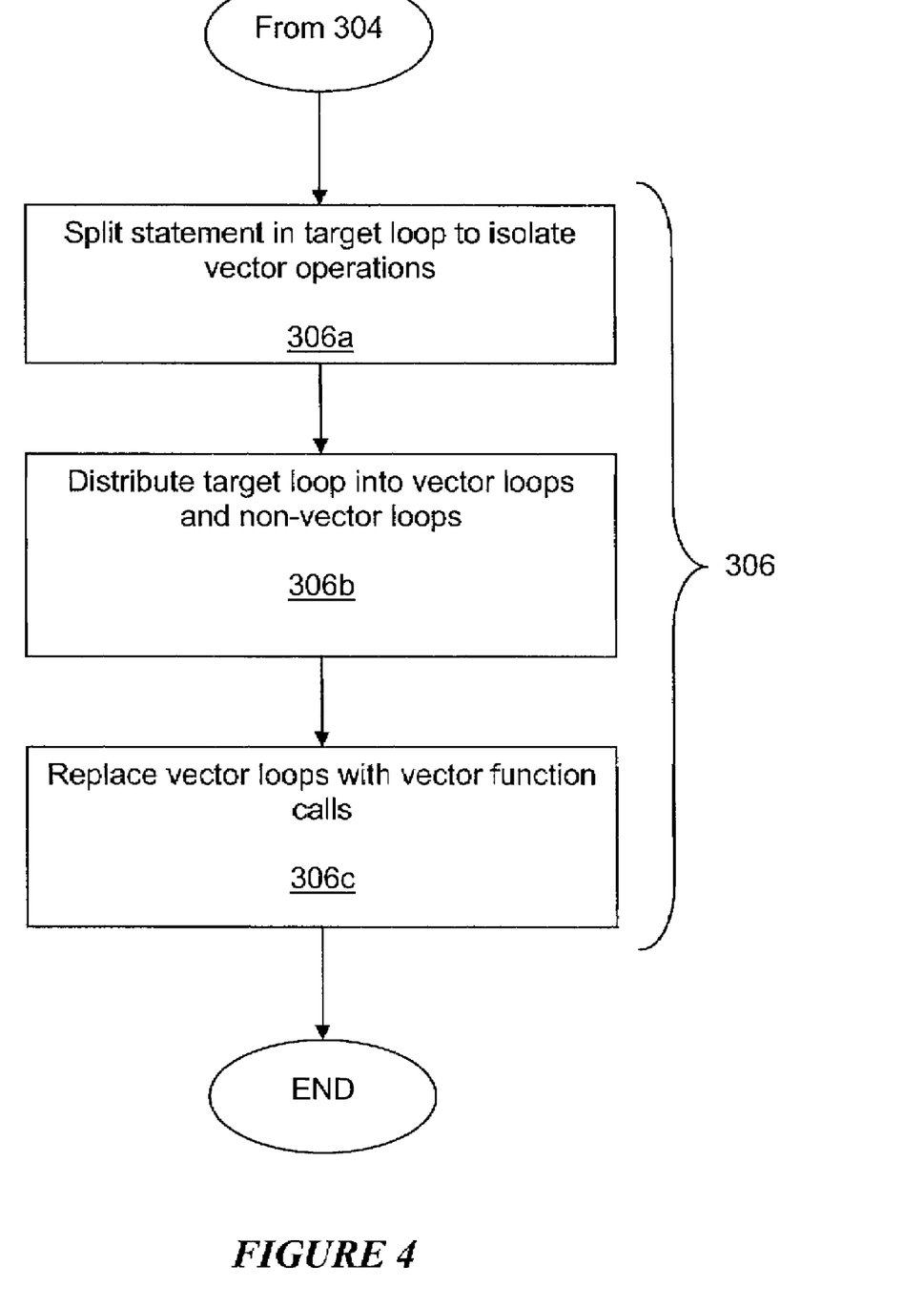
FIG. 4 is a flow chart showing an expansion of one of the steps of the flow chart in FIG. 3.

With reference now to FIG. 4, in the presently preferred embodiment the step 306 of replacing the vector loop containing the target operation with a function call to a vector library generally comprises three steps 306*a*, 306*b* and 306*c*. Step 306*c* is the step of actually replacing the vector loop with the function call, and steps 306*a* and 306*b* are generally carried out in preparation for carrying out step 306*c*.

At step 306*a*, the compiler will examine each vectorization candidate in a target loop and, if a particular statement containing the target operation contains non-vector operations as well, the compiler will split the statement so as to place the target operation into a separate statement by itself. For example, consider the following statement:

$$a[i] = sqrt(b[i]) + c[i].$$

If the compiler determines to vectorize only the sqrt component of this statement, the compiler would rewrite the statement as:

$$a[i] = sqrt(b[i]);$$
$$a[i] = a[i] + c[i];$$

Splitting vector expressions requires temporary vectors to hold the intermediate result. Although the overhead of creating temporary vectors is usually negligible compared to the increase in execution speed resulting from vectorization, there are various techniques to reduce this overhead. For example, a compiler can reuse an existing vector if possible instead of creating a new one. Loop transformations like strip-mining can also help reduce the size of temporary vectors.

The data feeding vector operations need not be a single array expression. For example, the result of a complex computation may feed the sqrt operation, as in the following example:

```
a[i] = a[i] + sqrt({a complex expression});
```

In this example, the splitting phase will copy the temporary result into a temporary vector that later feeds the sqrt operation, as shown below:

```
t0[i] = {a complex expression};
t0[i] = sqrt(t0[i]);
a[i] = a[i] * t0[i];
```

The step of splitting vector operations also handles sparse vector operations that are executed unconditionally by copying the sparse vector into a dense vector.

For sparse vector operations using index arrays, the compiler can choose whether to copy into a dense vector or not. The decision may be based on the density of the data feeding the vector operation, and/or on the library implementation of the vector functions.

After all vector statements are created and/or identified within a target loop, if the loop contains both vector statements and non-vector statements, at step 306b the compiler should divide the target loop in order to isolate the vector statements into their own loops; that is, the compiler will distribute the target loop into one or more vector loops containing the target operations (one loop for each target operation), and one or more non-vector loops containing non-vector statements. In some instances, due to data dependence or other restrictions, loop distribution could fail to isolate vector statements, in which case the loop would not be vectorized.

After the loops have been distributed into vector loops (containing the target operations) and non-vector loops (containing non-vector statements), at step 306c each vector loop containing a target operation is replaced with a vector function call.

As will be discussed in more detail below, in some instances it will be possible to omit sub-steps 306a and 306b, so that step 306 would consist only of sub-step 306c.

Figure 5:
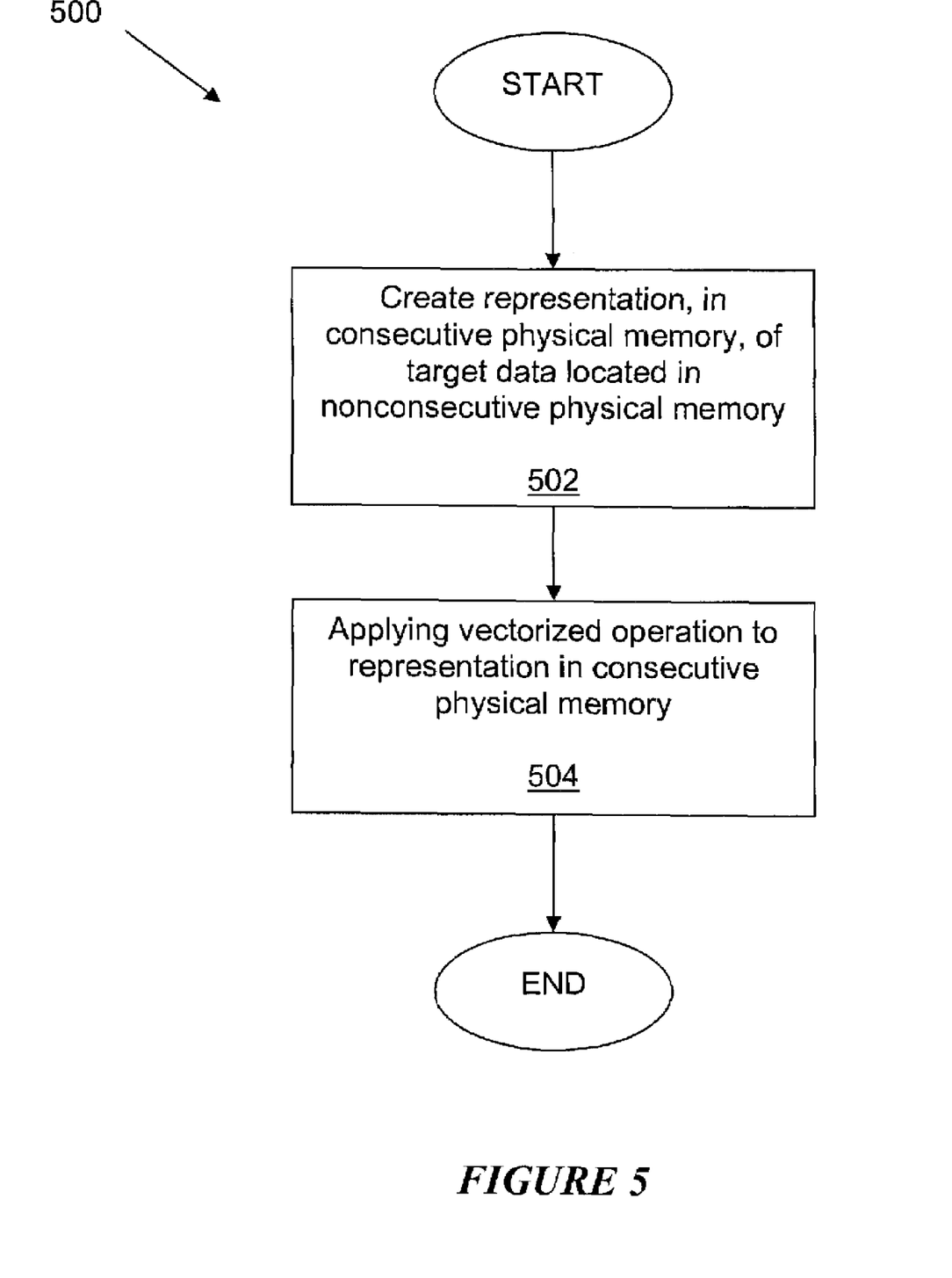
FIG. 5 is a flow chart showing a method of applying a vectorized target operation to data residing in nonconsecutive physical memory according to an aspect of the present invention.

Reference is now made to FIG. 5, showing an exemplary method 500 for applying a vectorized target operation to data residing in nonconsecutive physical memory. Method 500 would be carried out by a data processing system that is executing a software program according to an aspect of the present invention (for example, the software program being executed may have been compiled by a compiler operating in accordance with an aspect of the present invention).

At step 502, the data processing system creates, in consecutive physical memory, a representation of certain target data that is located in nonconsecutive physical memory. This representation may be an index array, or a copy of the target data, wherein the copy is located in consecutive physical memory. Step 502 may be carried out, for example, in response to a hardware instruction inserted by a compiler implementing aspects of the present invention.

At step 504, the data processing system applies the vectorized operation to the representation so that the data is processed according to the target operation. Where the representation is a copy of the target data in consecutive physical memory, the vectorized operation may be applied directly to the copy of the target data. Where the representation is an index array, the vectorized operation may be applied to the representation by passing the representation (that is, the index array) to a function call that calls a function from a vector function library.

Examples of the code modifications made by a compiler implementing methods according to aspects of the present invention will now be described, with reference to example loops (b) and (c) above. The examples herein use C code to facilitate understanding of how a target loop is transformed. It is to be appreciated that the examples are merely illustrative, and that in a preferred embodiment, a compiler implementing aspects of the present invention will operate on (that is, apply the transformations to) an intermediate representation of the source code and, once all transformations are complete, will then translate the intermediate representation into executable code. Modifying the intermediate representation of the source code to split the statement (step 306a), distribute the loop (step 306b) and replace the vector loop with a function call to a vector library (step 306c) will have the effect, once the intermediate representation is translated into executable code, of replacing the vector statement with a function call within the executable code. In an alternative embodiment, which more closely resembles the illustrative examples shown, the compiler may operate in a source-to-source mode whereby it would modify the source code to split the statement (step 306a), distribute the loop (step 306b) and replace the vector loop with a function call to a vector library (step 306c), after which the source code would be translated (by the same compiler or a different compiler) into executable code. This too will have the effect, after the source code is translated into executable code, of replacing the vector statement with the function call in the resulting executable code.

Reference is made first to example (b). Table 2.1 shows the original C code segment from example (b) above, as well as the result after an index array is created:

TABLE 2.1

| Original Loop | After Create Index Array |
| --- | --- |
| for (i=0; i<N; ++i)<br>  if (b[i] > 5)<br>    a[i] = sqrt(b[i]); | ti = 0;<br>for (i=0; i<N; ++i) {<br>  if (b[i] > 5) {<br>    t0[ti] = i;<br>    ti = ti + 1;<br>  }<br>}<br>for (i=0; i<ti; ++i)<br>  a[t0[i]] = sqrt(b[t0[i]]); |

Table 3.1 shows the modified C code segment from example (b) above after the index array is created (step 304), followed by the result after the statement in the target loop containing the target operation has been split (step 306a):

TABLE 3.1

(continuing from Table 2.1)

| After Create Index Array | After Split In Target Loop |
| --- | --- |
| ti = 0;<br>for (i=0; i<N; ++i) {<br>  if (b[i] > 5) {<br>    t0[ti] = i;<br>    ti = ti + 1;<br>  }<br>}<br>for (i=0; i<ti; ++i)<br>  a[t0[i]] = sqrt(b[t0[i]]); | ti = 0;<br>for (i=0; i<N; ++i) {<br>  if (b[i] > 5) {<br>    t0[ti] = i;<br>    ti = ti + 1;<br>  }<br>}<br>for (i=0; i<ti; ++i) {<br>  t1[i] = b[t0[i]];<br>  t1[i] = sqrt(t1[i]);<br>  a[t0[i]] = t1[i];<br>} |

Table 4.1 shows the modified C code segment after the statement in the target loop has been split (step 306*a*), together with the further modified C code segment resulting from the operations carried out to distribute the target loop (step 306*b*):

TABLE 4.1

(continuing from Table 3.1)

| After Split In Target Loop | After Loop Distribution |
|---|---|
| ti = 0;<br>for (i=0; i<N; ++i) {<br>  if (b[i] > 5) {<br>    t0[ti] = i;<br>    ti = ti + 1;<br>  }<br>}<br>for (i=0; i<ti; ++i) {<br>  t1[i] = b[t0[i]];<br>  t1[i] = sqrt(t1[i]);<br>  a[t0[i]] = t1[i];<br>} | ti = 0;<br>for (i=0; i<N; ++i) {<br>  if (b[i] > 5) {<br>    t0[ti] = i;<br>    ti = ti + 1;<br>  }<br>}<br>for (i=0; i<ti; ++i)<br>  t1[i] = b[t0[i]];<br>for (i=0; i<ti; ++i)<br>  t1[i] = sqrt(t1[i]);<br>for (i=0; i<ti; ++i)<br>  a[t0[i]] = t1[i];<br>} |

As can be seen in Table 4.1, the target loop in the example (b) code (as modified after distribution of the target loop (step 306*b*) following splitting of the statement therein (step 306*a*)) has been distributed into three loops, the first and last of which are the non-vector loops:

```
for (i=0; i<ti; ++i)
   t1[i] = b[t0[i]];
for (i=0; i<ti; ++i)
   a[t0[i]] = t1[i];
```

Vector processing of such operations is not likely to generate a significant performance improvement.

The second loop is the vector loop:

```
for (i=0; i<ti; ++i)
   t1[i] = sqrt(t1[i]);
```

The "sqrt(t1[i])" operation can be advantageously processed using vector techniques. It should be noted here that the vector loop must be the second loop, because the "sqrt(t1[i])" operation relies on the results of the non-vector "t1[i]=b[t0[i]]" operation in the first statement, and the "a[t0[i]]=t1[i]" operation in the third statement relies on the result of the vector loop.

Table 5.1A shows the C code resulting from distribution of the target loop into a vector loop and two non-vector loops (step 306*b*), followed by the result of replacing the vector loop containing the target operation with a function call to a vector library (step 306*c*):

TABLE 5.1A (based on 4.2)

| After Loop Distribution | After Vector Call Transform |
|---|---|
| ti = 0;<br>for (i=0; i<N; ++i) {<br>  if (b[i] > 5) {<br>    t0[ti] = i; | ti = 0;<br>for (i=0; i<N; ++i) {<br>  if (b[i] > 5) {<br>    t0[ti] = i; |

TABLE 5.1A-continued (based on 4.2)

| After Loop Distribution | After Vector Call Transform |
|---|---|
|     ti = ti + 1;<br>  }<br>}<br>for (i=0; i<ti; ++i)<br>  t1[i] = b[t0[i]];<br>for (i=0; i<ti; ++i)<br>  t1[i] = sqrt(t1[i]);<br>for (i=0; i<ti; ++i)<br>  a[t0[i]] = t1[i];<br>} |     ti = ti + 1;<br>  }<br>}<br>for (i=0; i<ti; ++i)<br>  t1[i] = b[t0[i]];<br>vsqrt(&t1[0],&t1[0],N);<br>for (i=0; i<ti; ++i)<br>  a[t0[i]] = t1[i];<br>} |

In the example shown in Table 5.1A above, the vector loop containing the target operation t1[i]=sqrt(t1[i]) is replaced by a call to a library of vector functions, which passes the relevant parameters to the vector function when called.

It should be noted that in some instances it may be possible to omit steps 306*a* (splitting) and 306*b* (loop distribution). Continuing to refer to the C code from example (b) above, there is now described an example where an index array is used and which does not require that the statement be split and the loop distributed. As will be recalled, Table 2.1 showed the results of using an index array for example (b) (step 304), and for convenience is repeated below:

TABLE 2.1

| Original Loop | After Create Index Array |
|---|---|
| for (i=0; i<N; ++i)<br>  if (b[i] > 5)<br>    a[i] = sqrt(b[i]); | ti = 0;<br>for (i=0; i<N; ++i) {<br>  if (b[i] > 5) {<br>    t0[ti] = i;<br>    ti = ti + 1;<br>  }<br>}<br>for (i=0; i<ti; ++i)<br>  a[t0[i]] = sqrt(b[t0[i]]); |

In this particular circumstance, it is not necessary for the vector statement to be split and the loop distributed because the target operation is already in a separate statement by itself and there is no non-vectorizable statement in the loop. Accordingly, the vector loop to be replaced is the target loop, and can be replaced with a function call to a vector library (step 306*c*) without any intervening steps, as shown in table 5.1B:

TABLE 5.1B (continuing from Table 2.1)

| After Create Index Array | After Vector Call Transform |
|---|---|
| ti = 0;<br>for (i=0; i<N; ++i) {<br>  if (b[i] > 5) {<br>    t0[ti] = i;<br>    ti = ti + 1;<br>  }<br>}<br>for (i=0; i<ti; ++i)<br>  a[t0[i]] = sqrt(b[t0[i]]); | ti = 0;<br>for (i=0; i<N; ++i) {<br>  if (b[i] > 5) {<br>    t0[ti] = i;<br>    ti = ti + 1;<br>  }<br>}<br>vsqrt(&a[0],&b[0],&t0[0],ti); |

Analogously to the first example (Table 5.1A), in the example shown in Table 5.1B above, the vector loop containing the target operation a[t0[i]]=sqrt(b[t0[i]]) is replaced by a call to a library of vector functions, which passes the relevant parameters to the vector function when called. It will be noted that because an index array is used directly, without the intervening steps of splitting the statement and distributing the loop, a different vector function is called, and the parameters passed to the function are different.

Reference will now be made to the C code segment from example (c) above. In particular, three illustrative implementations of methods according to aspects of the present invention will be described with reference to the C code segment from example (c).

Beginning with the first illustrative implementation, Table 2.2 shows the original C code segment, followed by the resulting code segment after an index array has been implemented (step 304):

TABLE 2.2

| Original Loop | After Create Index Array |
|---|---|
| for (i=0; i<N; ++i)<br>  a[i] = sqrt(b[2*i]); | ti = 0;<br>for (i=0; i<N; ++i) {<br>  t0[ti] = i*2;<br>  ti = ti + 1;<br>}<br>for (i=0; i<ti; ++i)<br>  a[i] = sqrt(b[t0[i]]); |

Table 3.2 shows the code segment resulting from creation of the index array (step 304), followed by the code segment resulting from splitting the statement in the target loop (step 306a):

TABLE 3.2

(continuing from table 2.2)

| After Create Index Array | After Split In Target Loop |
|---|---|
| ti = 0;<br>for (i=0; i<N; ++i) {<br>  t0[ti] = i*2;<br>  ti = ti + 1;<br>}<br>for (i=0; i<ti; ++i)<br>  a[i] = sqrt(b[t0[i]]); | ti = 0;<br>for (i=0; i<N; ++i) {<br>  t0[ti] = i*2;<br>  ti = ti + 1;<br>}<br>for (i=0; i<ti; ++i) {<br>  a[i] = b[t0[i]];<br>  a[i] = sqrt(a[i]);<br>} |

Table 4.2 shows the C code segment resulting from the operations carried out to split the statement in the target loop (step 306a), followed by the code segment resulting from distribution of the target loop (step 306b):

TABLE 4.2

(continuing from table 3.2)

| After Split In Target Loop | After Loop Distribution |
|---|---|
| ti = 0;<br>for (i=0; i<N; ++i) {<br>  t0[ti] = i*2;<br>  ti = ti + 1;<br>}<br>for (i=0; i<ti; ++i) {<br>  a[i] = b[t0[i]];<br>  a[i] = sqrt(a[i]);<br>} | ti = 0;<br>for (i=0; i<N; ++i) {<br>  t0[ti] = i*2;<br>  ti = ti + 1;<br>}<br>for (i=0; i<ti; ++i)<br>  a[i] = b[t0[i]];<br>for (i=0; i<ti; ++i)<br>  a[i] = sqrt(a[i]); |

As can be seen in table 4.2, the loop in the example (c) code has been distributed into two loops. The first loop is the non-vector loop:

for (i=0; i<ti; ++i)
  a[i] = b[t0[i]];

As in the previous example, this operation is inappropriate for vector processing because vector processing is unlikely to generate a substantial performance improvement.

The second loop is the vector loop:

for (i=0; i<ti; ++i)
  a[i] = sqrt(a[i]);

Again, this is a vector loop because the "sqrt(a[i])" operation can be advantageously processed using vector techniques. As with the previous example, it is important that the vector loop is the second loop, because the "sqrt(a[i])" operation relies on the results of the non-vector "a[i]=b[t0[i]]" operation.

Table 5.2A below shows the C code segment after loop distribution (step 306b), followed by the C code segment resulting from replacement of the vector loop containing the target operation with a function call to a vector library (step 306c):

TABLE 5.2A (continuing from Table 4.3)

| After Loop Distribution | After Vector Call Transform |
|---|---|
| ti = 0;<br>for (i=0; i<N; ++i) {<br>  t0[ti] = i*2;<br>  ti = ti + 1;<br>}<br>for (i=0; i<ti; ++i)<br>  a[i] = b[t0[i]];<br>for (i=0; i<ti; ++i)<br>  a[i] = sqrt(a[i]); | ti = 0;<br>for (i=0; i<N; ++i) {<br>  t0[ti] = i*2;<br>  ti = ti + 1;<br>}<br>for (i=0; i<ti; ++i)<br>  a[i] = b[t0[i]];<br>vsqrt(&a[0], &a[0], ti); |

It should be noted here that the example above, as illustrated by Tables 2.2, 3.2, 4.2 and 5.2A, represents a sub-optimal approach. The two illustrative implementations which follow will show more efficient techniques for applying methods according to aspects of the present invention to the C code segment from example (c) above.

In the first of these two illustrative implementations, steps 306a and 306b can be omitted. For convenience and completeness of illustration, FIG. 2.2, showing the original C code segment for example (c) above, and the result after creation of an index array (step 304), is repeated below:

TABLE 2.2

| Original Loop | After Create Index Array |
|---|---|
| for (i=0; i<N; ++i)<br>  a[i] = sqrt(b[2*i]); | ti = 0;<br>for (i=0; i<N; ++i) {<br>  t0[ti] = i*2;<br>  ti = ti + 1;<br>}<br>for (i=0; i<ti; ++i)<br>  a[i] = sqrt(b[t0[i]]); |

As noted above, in this illustrative implementation, the steps of splitting (step 306a) and distributing the loop (step 306b) are advantageously omitted, and the vector loop is the target loop. Accordingly, in this illustrative implementation, the vector loop containing the target operation is replaced with a function call to a vector library (step 306c) immediately following creation of the index array (step 304). Table 5.2B below shows the C code segment resulting from creation of the index array (step 304), followed by the C code segment resulting from replacement of the vector loop containing the target operation with a function call to a vector library (step 306c):

TABLE 5.2B (continuing from Table 2.2)

| After Create Index Array | After Vector Call Transform |
| --- | --- |
| ti = 0;<br>for (i=0; i<N; ++i) {<br>  t0[ti] = i*2;<br>  ti = ti + 1;<br>}<br>for (i=0; i<ti; ++i)<br>  a[i] = sqrt(b[t0[i]]); | ti = 0;<br>for (i=0; i<N; ++i) {<br>  t0[ti] = i*2;<br>  ti = ti + 1;<br>}<br>vsqrt(&a[0],&b[0],&t0[0],ti); |

In the next illustrative implementation applicable to the C code segment from example (c) above, at step 304 the contents of the sparse vector are copied into a dense vector (rather than creating an index array) so as to create the representation of the data in consecutive physical memory. Table 3.3 below shows the original C code segment from example (c), followed by the resulting code segment after the data has been copied to a dense vector (step 304):

TABLE 3.3

| Original Loop | After Copy to Dense Vector |
| --- | --- |
| for (i=0; i<N; ++i)<br>  a[i] = sqrt(b[2*i]); | for (i=0; i<N; ++i) {<br>  a[i] = b[2*i];<br>  a[i] = sqrt(a[i]);<br>} |

It will be appreciated that copying the data into the dense vector (step 304) has also had the effect of splitting the statement in the target loop (step 306a) so that this step need not be carried out separately.

Table 4.3 shows the code segment after the loop has been copied to a temporary dense vector (step 304), followed by the code segment after execution of the operations carried out to distribute the loop (step 306b):

TABLE 4.3

(continuing from table 3.3)

| After Copy to Dense Vector | After Loop Distribution |
| --- | --- |
| for (i=0; i<N; ++i) {<br>  a[i] = b[2*i];<br>  a[i] = sqrt(a[i]);<br>} | for (i=0; i<N; ++i)<br>  a[i] = b[2*i];<br>for (i=0; i<N; ++i)<br>  a[i] = sqrt(a[i]); |

As shown in Table 4.3 above, the loop comprising the code from example (c) above (as modified after the relevant data has been copied to a dense vector (step 304) so that the loop is effectively split (step 306a)) has been distributed into two loops (step 306b). The first loop is the non-vector loop:

```
for (i=0; i<N; ++i)
    a[i] = b[2*i];
```

As was the case with the previous illustrative implementations, this operation is not appropriate for vector processing because vector processing is unlikely to generate a substantial performance improvement.

The second loop is the vector loop:

```
for (i=0; i<N; ++i)
    a[i] = sqrt(a[i]);
```

As before, this is a vector loop because the target "sqrt(a[i])" operation can be processed using vector techniques. Again, it is important that, in the particular example shown, the vector loop is the second loop, since it must be executed after the first statement has completed execution in order to obtain correct results, because the target "sqrt(a[i])" operation relies on the results of the non-vector "a[i]=b[2*i]" operation.

Table 5.3 below shows the code segment resulting after loop distribution (step 306b), followed by the code segment resulting from replacement of the vector loop containing the target operation with a function call to a vector library (step 306c):

TABLE 5.3

(Continuing from table 4.3)

| After Loop Distribution | After Vector Call Transform |
| --- | --- |
| for (i=0; i<N; ++i)<br>  a[i] = b[2*i];<br>for (i=0; i<N; ++i)<br>  a[i] = sqrt(a[i]); | for (i=0; i<N; ++i)<br>  a[i] = b[2*i];<br>vsqrt(&a[0],&a[0],N); |

In the transformation shown in Table 5.3, the vector loop (that is, the target operation a[i]=sqrt(a[i]) and its associated "for" loop) are replaced with a call to a vector library (step 306c), in the form vsqrt(&a[0],&a[0],N).

A compiler implementing aspects of the present invention will, as it parses the source code, identify a target operation within a normalized target loop in the source code that is susceptible of vectorization and that may, after compilation into a vectorized form, seek to operate on data contained in nonconsecutive physical memory (step 302). Examples (b) and (c) above show examples of such target operations. After the compiler has identified the target operations, it will insert hardware instructions into the executable code it creates from the source code. These hardware instructions direct a computer platform on which the executable code will run to create a representation, in consecutive physical memory, of the data on which an executable version of the vectorized target operation might seek to operate (step 304). As has been shown above, the representation could be an index array in which each element points to an element of the data on which an executable version of vectorized target operation might seek to operate, or the representation could be a copy, in consecutive physical memory, of each element of the data. After it has inserted the hardware instruction, the compiler will then modify the executable code to replace the vector loop containing the target operation with a function call to a vector library (step 306). As noted above, this may be done by modifying the source code itself, or an intermediate representation of the source code, prior to translation into executable code.

A data processing system implementing aspects of the present invention (for example, because it is running executable code that has been compiled according to an aspect of the present invention) will be able to apply a vectorized target operation to data residing in nonconsecutive physical memory. Such a data processing system would (for example, in response to a hardware instruction inserted by the compiler) create, in consecutive physical memory, a representation of the data residing in nonconsecutive physical memory (step 502). As noted above, this representation could be an index array, or a copy of the data. After creating the representation, the data processing system would apply the vectorized operation to the representation so that the data is processed according to the target operation (step 504). In the case of an index array, the data processing system can apply the vectorized operation by passing the index array to a vector library function and executing the vector library function. In the case of a copy of the data in contiguous memory, the vectorized operation may be applied directly to the copy.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from one or more computer-usable or computer-readable media providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include, but are not limited to, a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A method for compiling source code into executable code, the method comprising:
    identifying a target operation in a normalized target loop in the source code, wherein the target operation is susceptible of vectorization and may, after compilation into a vectorized form, seek to operate on data contained in nonconsecutive physical memory;
    inserting hardware instructions into the executable code, wherein the hardware instructions direct a computer platform on which the executable code will run to create a representation of the data in consecutive physical memory, and
    replacing, within the executable code, a vector loop containing the target operation with a function call to a vector library, wherein the function call will call a vector function that will operate on the representation to generate a result identical to output expected from execution of the vector loop containing the target operation.

2. The method of claim 1, wherein the representation comprises a copy of each element of the data.

3. The method of claim 1, wherein the representation comprises an index array wherein each element of the index array points to an element of the data.

4. The method of claim 3, wherein the step of replacing a vector loop containing the target operation with a function call to a vector library is preceded by splitting a statement in the target loop containing the target operation and distributing the target loop into one or more non-vector loops containing at least one non-vector statement and the vector loop containing the target operation.

5. The method of claim 1, wherein the vector loop is the target loop.

6. A method of applying a vectorized target operation to data residing in nonconsecutive physical memory, the method comprising the steps of:
    creating a representation of the data in consecutive physical memory; and
    applying the vectorized target operation to the representation.

7. The method of claim 6, wherein creating the representation comprises copying the data into a single consecutive memory area to create contiguous duplicate data.

8. The method of claim 7, wherein applying the vectorized target operation comprises carrying out the vectorized target operation on the contiguous duplicate data.

9. The method of claim 6, wherein creating the representation comprises creating an index array wherein each element of the index array points to an element of the data.

10. The method of claim 9, wherein applying the vectorized target operation comprises passing the index array to a vector library function and carrying out the vector library function.

11. A computer program product comprising at least one computer-usable tangible storage device having computer-usable program code stored thereon for compiling source code into executable code, the computer program product comprising:

computer-usable program code for identifying a target operation in a normalized target loop in the source code, wherein the target operation is susceptible of vectorization and may, after compilation into a vectorized form, seek to operate on data contained in nonconsecutive physical memory;

computer-usable program code for inserting hardware instructions into the executable code, wherein the hardware instructions will direct a computer platform on which the executable code will run to create a representation of the data in consecutive physical memory, and computer-usable program code for replacing, within the executable code, a vector loop containing the target operation with a function call to a vector library, wherein the function call will call a vector function that will operate on the representation to generate a result identical to output expected from execution of the vector loop containing the target operation.

12. The computer program product of claim 11, wherein the representation comprises a copy of each element of the data.

13. The computer program product of claim 11, wherein the representation comprises an index array wherein each element of the index array points to an element of the data.

14. The computer program product of claim 13, further comprising computer usable program code for, prior to execution of the computer-usable program code for replacing the vector loop containing the target operation with the function call to the vector library, splitting a statement in the target loop containing the target operation and distributing the target loop into one or more non-vector loops containing at least one non-vector statement and the vector loop containing the target operation.

15. The computer program product of claim 11, wherein the vector loop is the target loop.

16. A computer program product comprising at least one computer-usable tangible storage device having computer-usable program code stored thereon for applying a vectorized target operation to data residing in nonconsecutive physical memory, the computer program product comprising:

computer-usable program code for creating a representation of the data in consecutive physical memory; and computer-usable program code for applying the vectorized target operation to the representation.

17. The computer program product of claim 16, wherein the computer-usable program code for creating the representation comprises computer-usable program code for copying the data into a single consecutive memory area to create contiguous duplicate data.

18. The computer program product of claim 17, wherein the computer-usable program code for applying the vectorized target operation comprises computer-usable program code for carrying out the vectorized operation on the contiguous duplicate data.

19. The computer program product of claim 16, wherein the computer-usable program code for creating the representation comprises computer-usable program code for creating an index array wherein each element of the index array points to an element of the data.

20. The computer program product of claim 19, wherein the computer-usable program code for applying the vectorized target operation comprises computer-usable program code for passing the index array to a vector library function and computer-usable program code for causing the vector library function to be carried out.

21. A data processing system comprising:

at least one processor;

a bus coupled to the processor;

at least one computer usable medium coupled to the bus, wherein the at least one computer usable medium contains a set of instructions for compiling source code into executable code and wherein the at least one processor is adapted to carry out the set of instructions by causing the data processing system to:

identify a target operation in a normalized target loop in the source code, wherein the target operation is susceptible of vectorization and may, after compilation into a vectorized form, seek to operate on data contained in nonconsecutive physical memory;

insert hardware instructions into the executable code, wherein the hardware instructions direct a computer platform on which the executable code will run to create a representation of the data in consecutive physical memory, and replace, within the executable code, a vector loop containing the target operation with a function call to a vector library, wherein the function call will call a vector function that will operate on the representation to generate a result identical to output expected from execution of the vector loop containing the target operation.

22. The data processing system of claim 21, wherein the representation comprises a copy of each element of the data.

23. The data processing system of claim 21, wherein the representation comprises an index array wherein each element of the index array points to an element of the data.

24. The data processing system of claim 23, wherein the at least one processor is adapted to carry out the set of instructions by causing the data processing system to, prior to replacing the vector loop containing the target operation with the function call to the vector library, split a statement in the target loop containing the target operation and distribute the target loop into one or more non-vector loops containing at least one non-vector statement and the vector loop containing the target operation.

25. The data processing system of claim 21, wherein the vector loop is the target loop.

26. A data processing system comprising:

at least one processor;

a bus coupled to the processor;

at least one computer usable medium coupled to the bus, wherein the at least one computer usable medium contains a set of instructions for applying a vectorized target operation to data residing in nonconsecutive physical memory and wherein the at least one processor is adapted to carry out the set of instructions by causing the data processing system to:

create a representation of the data in consecutive physical memory; and apply the vectorized target operation to the representation.

27. The data processing system of claim 26, wherein the at least one processor is adapted to carry out the set of instructions by causing the data processing system to create the representation by copying the data into a single consecutive memory area to create contiguous duplicate data.

28. The method of claim 27, wherein the at least one processor is adapted to carry out the set of instructions by causing the data processing system to apply the vectorized target operation by carrying out the vectorized operation on the contiguous duplicate data.

29. The method of claim 26, wherein the at least one processor is adapted to carry out the set of instructions by causing the data processing system to create the representation by creating an index array wherein each element of the index array points to an element of the data.

30. The method of claim 29, wherein the at least one processor is adapted to carry out the set of instructions by causing the data processing system to apply the vectorized target operation by passing the index array to a vector library function and carrying out the vector library function.

* * * * *